United States Patent
Barber

(10) Patent No.: US 10,532,823 B1
(45) Date of Patent: Jan. 14, 2020

(54) AVIATION SITUATION AWARENESS AND DECISION INFORMATION SYSTEM

(71) Applicant: Rockwell Collins, Inc., Cedar Rapids, IA (US)

(72) Inventor: Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 284 days.

(21) Appl. No.: 15/655,623

(22) Filed: Jul. 20, 2017

(51) Int. Cl.
- *B64D 43/00* (2006.01)
- *G08G 5/00* (2006.01)
- *G06T 11/60* (2006.01)
- *G06F 3/0482* (2013.01)
- *G06F 3/0484* (2013.01)

(52) U.S. Cl.
CPC .............. *B64D 43/00* (2013.01); *G06T 11/60* (2013.01); *G08G 5/0065* (2013.01); *G06F 3/0482* (2013.01); *G06F 3/04847* (2013.01); *G06T 2200/24* (2013.01)

(58) Field of Classification Search
CPC ... B64D 43/00; G06F 3/0482; G06F 3/04847; G06T 11/60; G06T 2200/24; G08G 5/0065
USPC ............................................................ 701/3
See application file for complete search history.

(56) References Cited

U.S. PATENT DOCUMENTS

| | | | | |
|---|---|---|---|---|
| 9,284,045 B1* | 3/2016 | Springer | ................ | G08G 5/003 |
| 2010/0105329 A1* | 4/2010 | Durand | ................ | G06F 1/1632 |
| | | | | 455/41.2 |
| 2011/0171612 A1* | 7/2011 | Gelinske | ................ | G09B 9/08 |
| | | | | 434/35 |
| 2012/0310450 A1* | 12/2012 | Srivastav | ............. | G08G 5/0021 |
| | | | | 701/3 |
| 2013/0232237 A1* | 9/2013 | Zulch, III | .......... | H04B 7/18506 |
| | | | | 709/220 |
| 2013/0305391 A1* | 11/2013 | Haukom | ................ | G06F 21/84 |
| | | | | 726/29 |
| 2016/0179327 A1* | 6/2016 | Zammit-Mangion | ....................... | G01C 23/00 |
| | | | | 701/7 |
| 2017/0178420 A1* | 6/2017 | Byrd, Jr. | ................ | G07C 5/008 |

OTHER PUBLICATIONS

Rockwell Collins, Inc., Airbus selects Rockwell Collins for FOMAX program to digitally connect A320 aircraft and operators, http://www.rockwellcollins.com/Data/News/2017-Cal-Yr/CS/20170621-FOMAX.aspx, Jun. 21, 2017, 4 pages.

(Continued)

*Primary Examiner* — Anshul Sood
(74) *Attorney, Agent, or Firm* — Suiter Swantz pc llo

(57) ABSTRACT

A system may include a non-avionics computing device, a data network switch, and avionics computing devices. The non-avionics computing device may be configured to execute a situation awareness program. Each of the avionics computing devices may be communicatively coupled to the data network switch. The avionics computing devices may include a first avionics computing device communicatively coupled to the non-avionics computing device. The first avionics computing device may be configured to: receive avionics data from other of the avionics computing devices; filter the avionics data from the other of the avionics computing devices based on a predetermined relevance to the situation awareness program; and output the filtered avionics data to the non-avionics computing device.

18 Claims, 10 Drawing Sheets

(56) References Cited

OTHER PUBLICATIONS

Electronic flight bag, Wikipedia, Jun. 18, 2017, https://en.wikipedia.org/wiki/Electronic_flight_bag, 3 pages.
Situation awareness, Wikipedia, Jun. 30, 2017, https://en.wikipedia.org/wiki/Situation_awareness, 11 pages.

* cited by examiner

AVIATION SITUATION AWARENESS AND DECISION INFORMATION SYSTEM

BACKGROUND

Pilots are facing a number of issues in the flight deck today. Industry and research organizations have been observing that procedural complexity is pushing past the limits of human capacity and part time automation is creating a crisis in the cockpit and eroding skills. Additionally, the trend has been to add systems and sensors leaving pilots to integrate and monitor information, and airplane system integration is going up while pilot system knowledge is going down. Too much to do without enough time, tools or resources leads to the inability to focus, assess risk, and manage threats and errors. Distractions result in a loss of situational awareness and continue to be the most pervasive human threat to safety. Situation awareness (SA) is being aware of what is happening around you and understanding what that information means to you now and in the future.

The underlying trend is that pilots are having greater difficulty in creating and maintaining a sufficient level of situation awareness, especially when it comes to aircraft systems and aircraft intent. The pilot can be severely challenged in rapidly bringing all of the available information together in a form that is manageable for making accurate decisions in a timely manner. It is becoming widely recognized that more data does not equal more information.

Currently implemented user interfaces are not designed around situation awareness and do not permit the flight crew to effectively manage the information available to gain a high level of understanding of what is happening.

Research indicates that people will act first to classify and understand a situation. The appropriate internal mental model (from training and/or experience) will then trigger a response leading to action. Situation Awareness becomes a key feature that dictates the success of the decision process. Pilots should go beyond simple perception of the state of their environment (both inside and outside the aircraft) and should understand the integrated meaning of what they are perceiving in light of their goals. Currently implemented user interfaces are not effective at creating a high level of situation awareness.

The perception of time and the temporal dynamics of information also come into play with situation awareness. Understanding how much time is available until an event occurs or an action is required occupies an important role. The ability to project the current situation into the future requires a highly developed mental model of system behavior, supported by situation awareness. By constantly projecting ahead, the pilot is able to develop a ready set of strategies and responses to potential events.

While the underlying information content of today's flight deck is sufficient for supporting the flight crew's situation awareness, the architecture and organizational schemes for the information are inadequate. In fact, certain elements of temporal information, as it relates to the flight plan, are currently hidden from the flight crew and only used as "internal" parameters. Currently implemented decision support tools are primarily aimed at avoiding external hazards (e.g., weather, terrain, traffic) and supporting flight plan re-routes rather than supporting flight crew situation awareness.

SUMMARY

In one aspect, embodiments of the inventive concepts disclosed herein are directed to a system. The system may include a non-avionics computing device, a data network switch, and a plurality of avionics computing devices. The non-avionics computing device may include a display, a non-avionics non-transitory computer-readable medium, and a non-avionics processor communicatively coupled to the non-avionics non-transitory computer-readable medium. The non-avionics computing device may be implemented onboard an aircraft. The non-avionics processor may be configured to execute a situation awareness program stored in the non-avionics non-transitory computer-readable medium. The data network switch may be implemented in the aircraft. The plurality of avionics computing devices may be implemented in the aircraft. Each of the plurality of avionics computing devices may be communicatively coupled to the data network switch. Each of the plurality of avionics computing devices may include a non-transitory computer-readable medium and a processor communicatively coupled to the non-transitory computer-readable medium. The plurality of avionics computing devices may include a first avionics computing device communicatively coupled to the non-avionics computing device. The first avionics computing device may be configured to: receive avionics data from other of the plurality of avionics computing devices; filter the avionics data from the other of the plurality of avionics computing devices based on a predetermined relevance to the situation awareness program; and output the filtered avionics data to the non-avionics computing device.

In a further aspect, embodiments of the inventive concepts disclosed herein are directed to a system. The system may include a non-vetronics computing device, a data network switch, and a plurality of vetronics computing devices. The non-vetronics computing device may include a display, a non-vetronics non-transitory computer-readable medium, and a non-vetronics processor communicatively coupled to the non-vetronics non-transitory computer-readable medium. The non-vetronics computing device may be implemented onboard a vehicle. The non-vetronics processor may be configured to execute a situation awareness program stored in the non-vetronics non-transitory computer-readable medium. The data network switch may be implemented in the vehicle. The plurality of vetronics computing devices may be implemented in the vehicle. Each of the plurality of vetronics computing devices may be communicatively coupled to the data network switch. Each of the plurality of vetronics computing devices may include a non-transitory computer-readable medium and a processor communicatively coupled to the non-transitory computer-readable medium. The plurality of vetronics computing devices may include a first vetronics computing device communicatively coupled to the non-vetronics computing device. The first vetronics computing device may be configured to: receive vetronics data from other of the plurality of vetronics computing devices; filter the vetronics data from the other of the plurality of vetronics computing devices based on a predetermined relevance to the situation awareness program; and output the filtered vetronics data to the non-vetronics computing device.

In a further aspect, embodiments of the inventive concepts disclosed herein are directed to a method. The method may include receiving, by a processor of an avionics computing device of a plurality of avionics computing devices, avionics data from other of the plurality of avionics computing devices, the plurality of avionics computing devices implemented in an aircraft. The method may include filtering, by the processor of the avionics computing device, the avionics data from the other of the plurality of avionics computing devices based on a predetermined relevance to a situation awareness program stored in at least one non-avionics non-transitory computer-readable medium of a non-avionics computing device. The method may include outputting, by the processor of the avionics computing device, the filtered avionics data to the non-avionics computing device, wherein the non-avionics computing device may be implemented onboard the aircraft.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
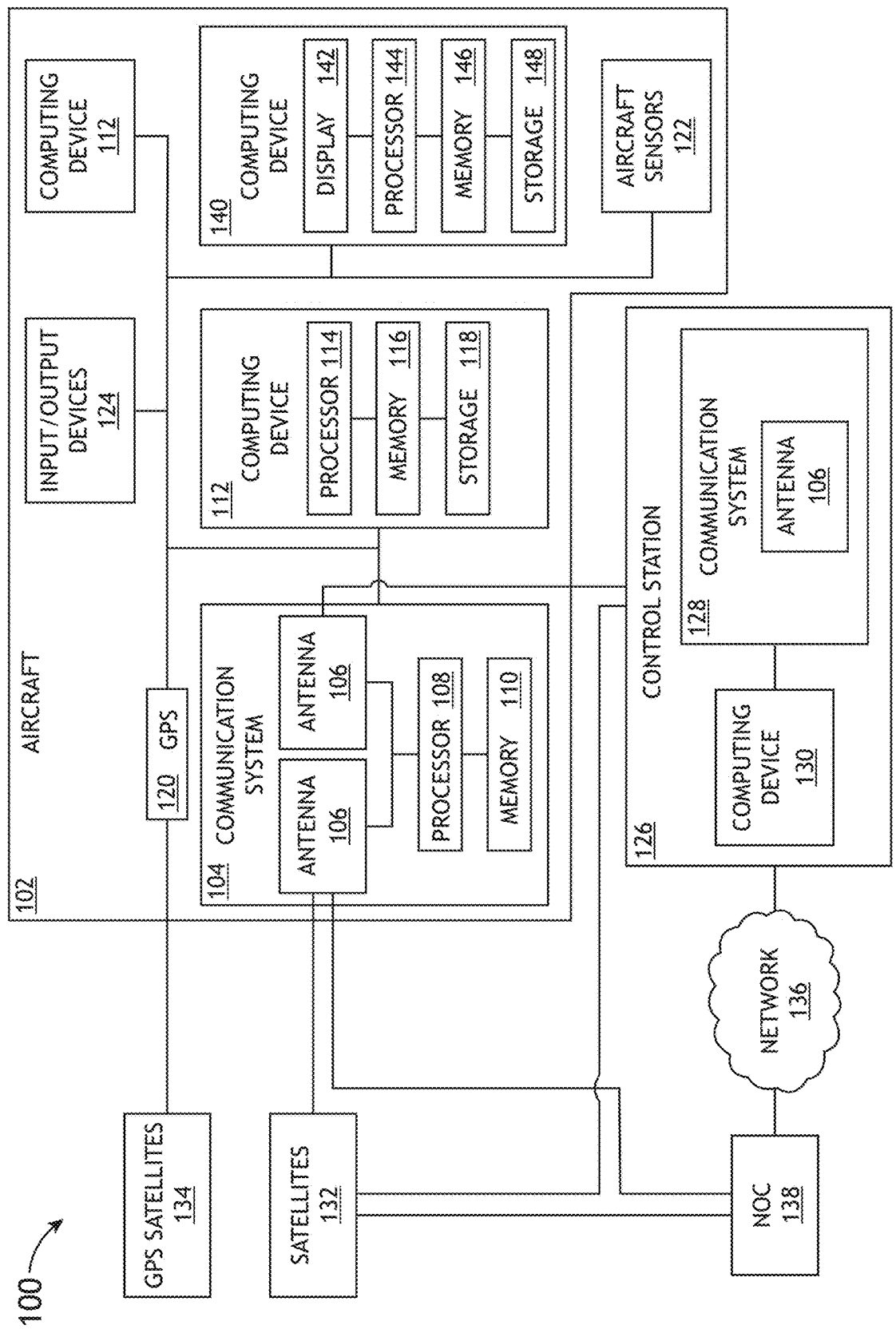
FIG. 1 is a view of an exemplary embodiment of a system including an aircraft, a control station, satellites, global positioning system (GPS) satellites, a network, and a network operations center (NOC) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and a method. Some embodiments may include a non-vetronics computing device configured to provide an operator of a vehicle with relevant information, organized in such a way as to improve (e.g., maximize) situation awareness. Some embodiments may include a non-avionics computing device configured to provide flight crew with relevant information, organized in such a way as to improve (e.g., maximize) situation awareness. A non-avionics computing device may include any computing device that is not part of the avionics of an aircraft. The non-avionics computing device may include a situation awareness program (e.g., a situation awareness and decision information program) stored in a non-transitory computer readable medium. Execution of the situation awareness program may cause the non-avionics computing device to enhance situation awareness for any number of goals, such as internal awareness of system health to external awareness of airport conditions. In some embodiments, the non-avionics computing device may be implemented onboard an aircraft as a mobile computing device, such as a laptop computing device or a tablet computing device. The non-avionics computing device may be configured to receive (e.g., receive via a secure wireless connection) a stream of data from an avionics computing device (e.g., a secure server router computing device). The avionics computing device may be configured to filter avionics data (e.g., data from avionics computing devices and/or aircraft sensors) from a plurality of other avionics computing devices and output the filtered avionics data to the non-avionics computing device as the stream of data. In some embodiments, the non-avionics computing device may be configured to receive data (e.g., weather forecast data) from off-board sources in addition to the filtered avionics data.

The non-avionics computing device may be configured to organize a portion of the filtered avionics data into situation awareness data structures (e.g., databases, records, files, journals, tables, lists (e.g., linked lists), or a combination thereof). Each of the situation awareness data structures may be configured to contain a portion of the filtered avionics data associated with a situation of a plurality of predetermined situations. For example, the plurality of predetermined situations may include a flight configuration profile during a particular stage of flight, system synoptics, a takeoff, a landing, and/or trajectory conformance. Additionally, the non-avionics computing device may be configured to receive a user input (e.g., a user selection) to display content associated with a particular situation awareness data structure. Further, the non-avionics computing device may be configured to generate a graphical user interface based at least on the particular situation awareness data structure. The graphical user interface may include graphical representation content associated with the particular situation awareness data structure and textual content associated with the particular situation awareness data structure, and the graphical representation content and the textual content may be relevant to the particular situation. Additionally, the non-avionics computing device may be configured to output the graphical user interface to a display of the non-avionics computing device for presentation to a user, such as a flight crew member (e.g., a pilot). For example, execution of the situation awareness program is configured to enhance a situational awareness of a crew member user onboard the aircraft by displaying graphical representation content and the textual content relevant to the particular situation. As such, embodiments improve the field of aviation by enhancing flight crew member situational awareness so as to improve aircraft safety.

In some embodiments, regulatory authority certification requirements, such as Federal Aviation Administration (FAA) certification requirements, would be minimized as the situation awareness program running on the non-avionics computing device integrates pre-existing avionics data into information structures that support situation awareness. In an exemplary embodiment, none of the filtered avionics data would be unique to the non-avionics computing device such that, if the non-avionics computing device were to fail, the flight crew could still source all required information from avionics computing devices of the aircraft. In some embodiments, the non-avionics computing device is not and need not be certified by the FAA. For example, in some embodiments, the non-avionics computing device may be restricted from sending data to any of the avionics computing device such that the non-avionics computing device may be configured to only unidirectionally communicate (e.g., receive only) with the avionics computing device.

Referring now to FIG. 1, an exemplary embodiment of a system 100 according to the inventive concepts disclosed herein includes at least one aircraft 102, a control station 126, satellites 132, global positioning system (GPS) satellites 134, a network 136, and a network operations center (NOC) 138. Some or all of the aircraft 102, the control station 126, the satellites 132, the GPS satellites 134, the network 136, and the NOC 138 may be communicatively coupled at any given time.

The aircraft 102 includes at least one communication system 104, a plurality of computing devices 112 (which may also be referred to as aircraft computing devices, helicopter computing devices, or vehicular computing devices as may be appropriate), a GPS device 120, aircraft sensors 122, input/output devices 124, and a computing device 140 (e.g., a non-avionics computing device), as well as other systems, equipment, and devices commonly included in aircraft. Some or all of the communication system 104, the computing devices 112, the GPS device 120, the aircraft sensors 122, the input/output devices 124, the computing device 140, and any other systems, equipment, and devices commonly included in the aircraft 102 may be communicatively coupled. While not shown, in some embodiments, the aircraft 102 may optionally include a NOC or include components (e.g., at least one computing device 112 and/or the communication system 104) configured to perform functionality similar to the NOC 138. The aircraft 102 may be implemented as any suitable aircraft, such as a helicopter or airplane. While the system 100 is exemplarily shown as including the aircraft 102, in some embodiments the inventive concepts disclosed herein may be implemented in or on non-vetronics computing devices and vetronics computing devices of any suitable vehicle (e.g., an automobile, train, submersible craft, watercraft, or spacecraft) or in any suitable environment.

The communication system 104 includes one or more antennas 106 (e.g., two antennas 106, as shown), a processor 108, and memory 110, which are communicatively coupled. The communication system 104 (such as via one or more of the antennas 106) is configured to send and/or receive signals, data, messages, and/or voice transmissions to and/or from the control station 126, other vehicles, the satellites 132, the NOC 138, and combinations thereof, as well as any other suitable devices, equipment, or systems. That is, the communication system 104 is configured to exchange (e.g., bi-directionally exchange) signals, data, messages, and/or voice communications with any other suitable communication system (e.g., which may be implemented similarly and function similarly to the communication system 104). Additionally, for example, the communication system 104 may be configured to exchange, send, and/or receive (e.g., via a wireless connection, a cabled connection, and/or a wired connection, a passenger broadband service connection, a safety services connection, or a combination thereof) signals, data, messages, and/or voice communications with, to, and/or from any suitable onboard device(s).

The communication system 104 may include at least one processor 108 configured to run or execute various software applications, computer code, and/or instructions stored (e.g., maintained) in at least one non-transitory computer-readable medium (e.g., at least one computer-readable medium implemented as hardware; e.g., at least one non-transitory processor-readable medium, at least one memory 110 (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof). Some or all of the at least one computer-readable medium may be communicatively coupled. For example, the processor 108 may be configured to receive data from the computing devices 112 and execute instructions configured to cause a particular antenna of the antennas 106 to transmit the data as a signal(s) to another communication system (e.g., 128) of the system 100. Likewise, for example, the processor 108 may be configured to route data received as a signal(s) by a particular antenna of the antennas 106 to one or more of the computing devices 112. In some embodiments, the processor 108 may be implemented as one or more radiofrequency (RF) processors.

Each of the antennas 106 may be implemented as or may include any suitable antenna or antenna device. For example, the antennas 106 may be implemented as or include at least one electronically scanned array (ESA) (e.g., at least one active ESA (AESA)), at least one radio (e.g., at least one software defined radio (SDR)), at least one transmitter, at least one receiver, at least one transceiver, or a combination thereof.

While the communication system 104 is shown as having two antennas 106, one processor 108, and memory 110, the communication system 104 may include any suitable number of antennas 106, processors 108, and memory 110. Further, the communication system 104 may include other components, such as a storage device (e.g., solid state drive or hard disk drive), radio tuners, and controllers.

Each of the computing devices 112 of the aircraft 102 may include at least one processor 114, memory 116, and storage 118, as well as other components, equipment, and/or devices commonly included in a computing device, all of which may be communicatively coupled to one another. Each of the computing devices 112 may be configured to route data to each other as well as to the communication system 104 for transmission to an off-board destination (e.g., satellites 132, NOC 138, control station 126). Likewise, each computing device 112 may be configured to receive data from another computing device 112 as well as from the communication system 104 transmitted from off-board sources (e.g., satellites 132, NOC 138, control station 126). The computing device 112 may include or may be implemented as and/or be configured to perform the functionality of any suitable aircraft system, such as an engine indication and crew alerting system (EICAS) computing device (e.g., 112-2), a flight management system (FMS) computing device (e.g., 112-3), an integrated flight information system (IFIS) computing device (e.g., 112-4), an information management system (IMS) computing device (e.g., 112-5), an onboard maintenance system (OMS) computing device (e.g., 112-6), a terrain awareness and warning system (TAWS) computing device (e.g., 112-7), and a secure server router computing device (e.g., 112-8). (See, e.g., FIG. 4.) The processor 114 may be configured to run various software applications or computer code stored (e.g., maintained) in a non-transitory computer-readable medium (e.g., memory 116 or storage 118) and configured to execute various instructions or operations. Additionally, for example, the computing devices 112 or the processors 114 may be implemented as special purpose computers or special purpose processors configured (e.g., programmed) to execute instructions for performing any or all of the operations disclosed throughout. In some embodiments, the aircraft 102 may include any suitable number of computing devices 112.

The GPS device 120 receives location data from the GPS satellites 134 and may provide vehicular location data (e.g., aircraft location data) to any of various equipment/systems of the aircraft 102 (e.g., the communication system 104, the computing devices 112, the aircraft sensors 122, the input/output devices 124, and the computing device 140). The GPS device 120 may include a GPS receiver and a processor. For example, the GPS device 120 may receive or calculate location data from a sufficient number (e.g., at least four) of GPS satellites 134 in view of the aircraft 102 such that a GPS solution may be calculated. In some embodiments, the GPS device 120 may be implemented as or as part of a computing device 112, the communication system 104, navigation sensors of the aircraft sensors 122, and/or one of the input/output devices 124. The GPS device 120 may be configured to provide the location data to any of various equipment/systems of a vehicle. For example, the GPS device 120 may provide location data to the computing devices 112, the communication system 104, and the input/output devices 124. Further, while FIG. 1 depicts the GPS device 120 implemented in the aircraft 102, in other embodiments, the GPS device 120 may be implemented in or on any type of vehicle, such as automobiles, spacecraft, trains, watercraft, or submersible craft.

The computing device 140 of the aircraft 102 may include a display 142 (e.g., a touchscreen display), at least one processor 144, memory 146, and storage 148, as well as other components, equipment, and/or devices commonly included in a computing device, all of which may be communicatively coupled to one another. The computing device 140 may be implemented as a non-vetronics computing device (e.g., a non-avionics computing device). The computing device 140 may be configured to receive (e.g., receive via a secure wireless connection) a stream of filtered avionics data from an avionics computing device (e.g., 112). Additionally, the computing device 112 may be configured to receive data (e.g., weather forecast data) from off-board sources. The computing device 140 may include a situation awareness program stored in a non-transitory computer readable medium (e.g., memory 146 and/or storage 148), and the processor 144 of the computing device 140 may be configured to execute the situation awareness program. The computing device 140 may be implemented as any suitable computing device, such as a wearable computing device and/or a mobile computing device (e.g., a laptop computing device, a tablet computing device, or a smart phone). The processor 144 may be configured to run various software applications (e.g., the situation awareness program) or computer code stored (e.g., maintained) in a non-transitory computer-readable medium (e.g., memory 146 and/or storage 148) and configured to execute various instructions or operations. Additionally, for example, the computing device 140 or the processor 144 may be implemented as a special purpose computer or a special purpose processor configured (e.g., programmed) to execute instructions for performing any or all of the operations disclosed throughout. In some embodiments, the aircraft 102 may include any suitable number of computing devices 140.

While the communication system 104, the computing devices 112, the GPS device 120, the aircraft sensors 122, the input/output devices 124, and the computing device 140 of the aircraft 102 have been exemplarily depicted as being implemented as separate devices or systems, in some embodiments, some or all of the communication system 104, the computing devices 112, the GPS device 120, the aircraft sensors 122, and/or the input/output devices 124 may be implemented as a single integrated system or device or as any number of integrated and/or partially integrated systems and/or devices.

The control station 126 includes at least one communication system 128 and at least one computing device 130, as well as other systems, equipment, and devices commonly included in a control station. Some or all of the communication system 128, the computing device 130, and other systems, equipment, and devices commonly included in a control station may be communicatively coupled. The control station 126 may be implemented as a fixed location ground control station (e.g., a ground control station of an air traffic control tower, or a ground control station of a network operations center (e.g., 138)) located on the ground of the earth. In some embodiments, the control station 126 may be implemented as a mobile ground control station (e.g., a ground control station implemented on a non-airborne vehicle (e.g., an automobile or a ship) or a trailer). In some embodiments, the control station 126 may be implemented as an air control station implemented on an airborne vehicle (e.g., aircraft). The control station 126 may include a NOC or be communicatively coupled to the NOC 138 (e.g., via the network 136).

The communication system 128 and components thereof (such as antenna 106) of the control station 126 may be implemented similarly to the communication system 104 except that, in some embodiments, the communication system 128 may be configured for operation at a fixed location. The computing device 130 and components thereof (such as a processor (not shown) and memory (not shown)) of the control station 126 may be implemented similarly to the computing devices 112.

While the antennas 106 are exemplarily depicted as being implemented in the aircraft 102 and the control station 126, in some embodiments, antennas 106 may be implemented in, on, or coupled to any other suitable device, equipment, or system, such as a computing device (e.g., a laptop computing device, a mobile computing, a wearable computing device, or a smart phone), a mobile communication system (e.g., a man pack communication system), or satellites 132.

The network 136 may be implemented as any suitable network or combination of networks. For example, the network 136 may include or be implemented as the internet, a portion of the internet (such as a secured optical fiber network), an intranet, a wide area network (WAN), a local area network (LAN), and/or a mobile telecommunications network (e.g., a third generation (3G) network or a fourth generation (4G) network)). While the system 100 is exemplarily shown as including the network 136, the system 100 or various components of the system 100 may include or be communicatively coupled via any suitable number and any suitable types of networks.

The NOC 138 may connect a particular type of communications (e.g., satellite communications with the satellites 132 and/or aircraft communications with the aircraft 102) with the network 136.

While FIG. 1 exemplarily includes elements as shown, in some embodiments, one or more of the elements of the system 100 may be omitted, or the system 100 may include other elements. For example, one or more of the GPS satellites 134, satellites 132, the control station 126, the network 136, or the NOC 138 may be optional. Additionally, while an embodiment has been depicted as including one control station (e.g., the control station 126), other embodiments may include any number of control stations of various types positioned or moving anywhere in the system 100.

Figure 2:
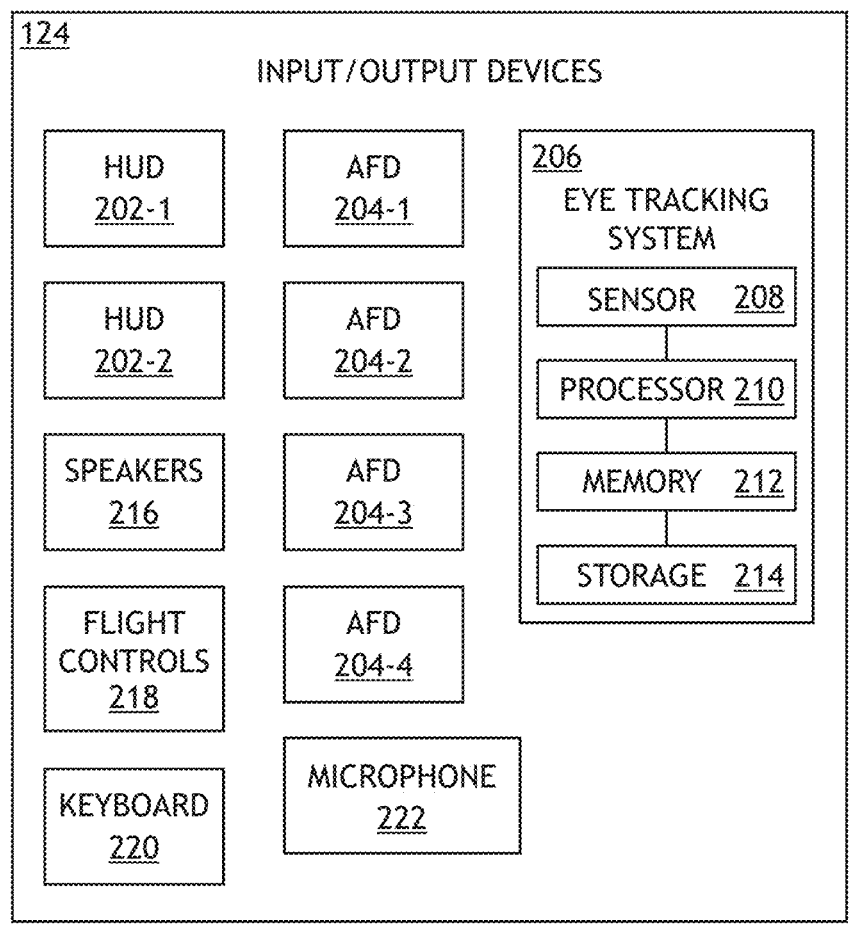
FIG. 2 is a view of the input/output devices of the aircraft of FIG. 1 according to the inventive concepts disclosed herein.

Referring now to FIG. 2, the input/output devices 124 of the aircraft 102 of FIG. 1 may include one or more displays (e.g., at least one head-up display (HUD), at least one adaptive flight display (AFD), or a combination thereof), at least one eye tracking system 206, speakers 216, flight controls 218, at least one keyboard 220, at least one microphone 222, or a combination thereof, some or all of which may be communicatively coupled at any given time. While FIG. 2 depicts the various exemplary input/output devices 124, the input/output devices 124 may include any suitable input/output devices. For example, the input/output devices 124 may include an electronic flight bag (EFB).

For example, the displays of the input/output devices 124 may include two HUDs 202-1, 202-2 (which may collectively be referred to as HUDs 202) and four AFDs 204-1, 204-2, 204-3, 204-4 (which may collectively be referred to as AFDs 204). Each of the HUDs 202 and the AFDs 204 may be configured to present streams of images (e.g., as video or still images) to a user (e.g., a pilot or an operator). In some embodiments, the HUDs 202 and/or AFDs 204 may be implemented as or include a touchscreen display. In some embodiments, one or more of the HUDs 202 and the AFDs 204 may include an integrated computing device (which may be implemented and function similarly to one of the computing devices 112 of FIG. 1) and/or integrated computing device components (which may be implemented and function similarly to components of one of the computing devices 112 of FIG. 1). Each of the HUDs 202 and the AFDs 204 may be communicatively coupled to one or more of the computing devices 112, the communication system 104, the GPS device 120, other of the input/output devices 124, and/or the aircraft sensors 122 of FIG. 1.

The eye tracking system 206 is configured to track eye gestures, track movement of a user's eye, track a user's gaze, and/or otherwise receive inputs from a user's eyes. The eye tracking system 206 may be configured for performing fully automatic eye tracking operations of users in real time. The eye tracking system 206 may include at least one sensor 208, at least one processor 210, a memory 212, and a storage 214, as well as other components, equipment, and/or devices commonly included in an eye tracking system. The sensor 208, the processor 210, the memory 212, and the storage 214, as well as the other components, equipment, and/or devices commonly included in the eye tracking system 206 may be communicatively coupled.

Each sensor 208 may be implemented as any of various sensors suitable for an eye tracking system. For example, the at least one sensor 208 may include or be implemented as one or more optical sensors (e.g., at least one camera configured to capture images in the visible light spectrum and/or the infrared spectrum). In some embodiments, the at least one sensor 208 is one or more dedicated eye tracking system sensors. While the sensor 208 has been exemplarily depicted as being included in the eye tracking system 206, in some embodiments, the sensor 208 may be implemented external to the eye tracking system 206. For example, the sensor 208 may be implemented as an optical sensor (e.g., of the optical sensors 316 of the aircraft sensors 122) located within the aircraft 102 and communicatively coupled to the processor 210.

The processor 210 may be configured to process data received from the sensor 208 and output processed data to one or more onboard devices or onboard systems (e.g., the communication system 104, the computing devices 112, the aircraft sensors 122, other of the input/output devices 124, or a combination thereof). For example, the processor 210 may be configured to generate eye tracking data and output the generated eye tracking data to one of the computing devices 112. The processor 210 of the eye tracking system 206 may be configured to run various software applications or computer code stored (e.g., maintained) in a non-transitory computer-readable medium (e.g., memory 212 and/or storage 214) and configured to execute various instructions or operations. The processor 210 may be implemented as a special purpose processor configured to execute instructions for performing any or all of the operations disclosed throughout.

In some embodiments, some or all of the input/output devices 124 may include an integrated computing device (which may be implemented and function similarly to one of the computing devices 112 of FIG. 1) and/or integrated computing device components (which may be implemented and function similarly to components of one of the computing devices 112 of FIG. 1).

Figure 3:
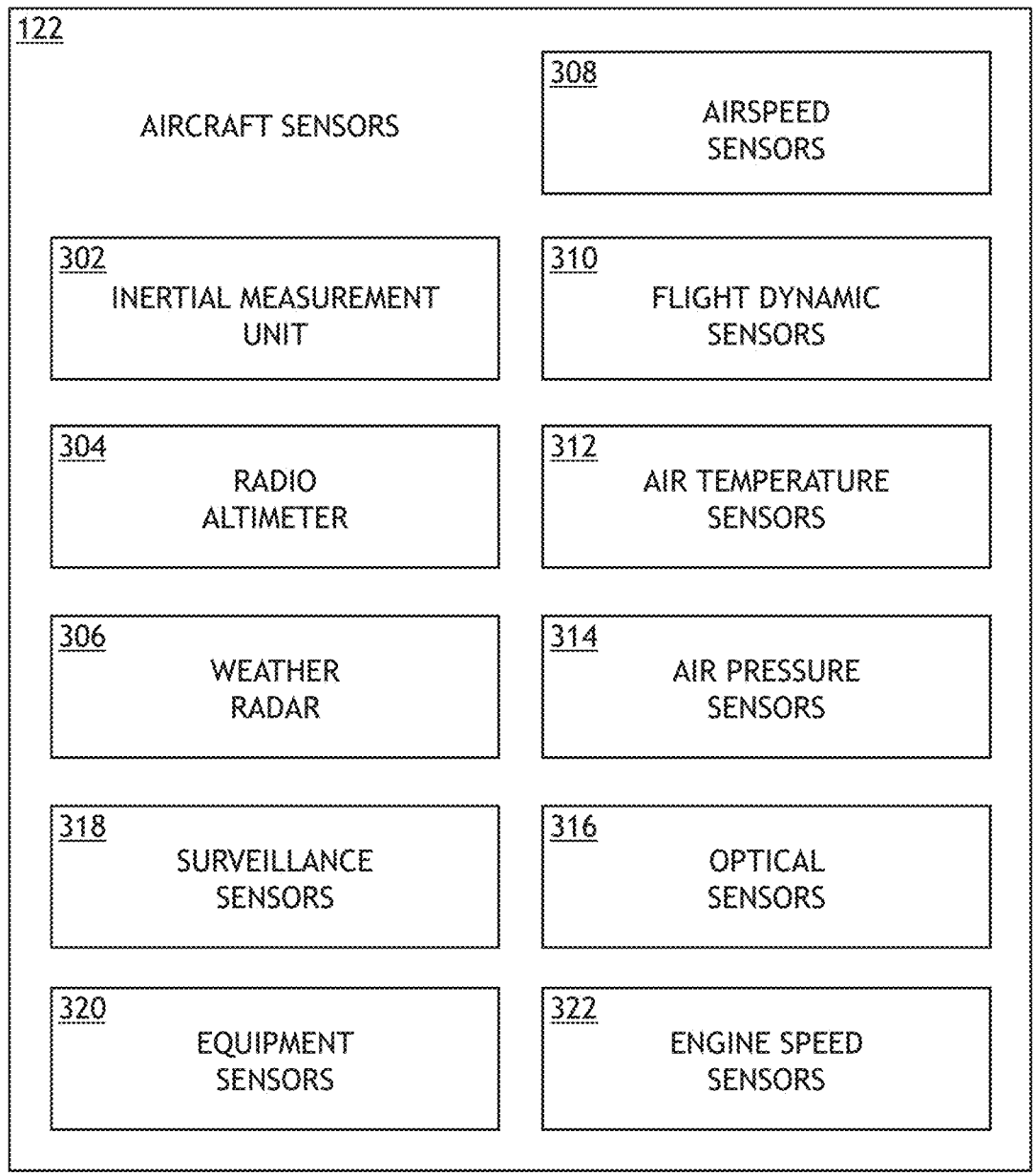
FIG. 3 is a view of the aircraft sensors of the aircraft of FIG. 1 according to the inventive concepts disclosed herein.

Referring now to FIG. 3, the aircraft sensors 122 of FIG. 1 are shown. Each of the aircraft sensors 122 may be configured to sense a particular condition(s) external to the aircraft 102 or within the aircraft 102 and output data associated with particular sensed condition(s) to one or more onboard devices or onboard systems (e.g., the communication system 104, the computing devices 112, the aircraft sensors 122, the input/output devices 124, or a combination thereof). For example, the aircraft sensors 122 may include an inertial measurement unit 302, a radio altimeter 304, weather radar 306, airspeed sensors 308, flight dynamic sensors 310 (e.g., configured to sense pitch, roll, and/or yaw), air temperature sensors 312, air pressure sensors 314, optical sensors 316 (e.g., cameras configured to capture images in the visible light spectrum and/or the infrared spectrum), surveillance sensors 318, equipment sensors 320 (e.g., electrical system sensors, hydraulic system sensors, bleed air sensors, environmental conditioning sensors, fuel sensors, and/or fire warning/suppression sensors), and engine speed sensors 322, some or all of which may be communicatively coupled at any given time. Additionally, the GPS device 120 may be considered as one of the aircraft sensors 122.

For example, at least some of the aircraft sensors 122 may be implemented as navigation sensors (e.g., the GPS device 120, the inertial measurement unit 302, a radio altimeter 304, weather radar 306, airspeed sensors 308, flight dynamic sensors 310, air temperature sensors 312, and/or air pressure sensors 314) configured to sense any of various flight conditions or aircraft conditions typically used by aircraft and output navigation data (e.g., aircraft location data, aircraft orientation data, aircraft direction data, aircraft speed data, and/or aircraft acceleration data). For example, various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft roll, aircraft yaw, air temperature, and/or air pressure. For example, the GPS device 120 and the inertial measurement unit 302 may provide aircraft location data and aircraft orientation data, respectively, to a processor (e.g., a processor of the GPS device 120, processor 114, processor 114-1, processor 108, processor 210, or a combination thereof).

In some embodiments, some or all of the aircraft sensors 122 may include an integrated computing device (which may be implemented and function similarly to one of the computing devices 112 of FIG. 1) and/or integrated computing device components (which may be implemented and function similarly to components of one of the computing devices 112 of FIG. 1).

Further, while the aircraft sensors 122 are implemented in or on the aircraft 102, some embodiments may include vehicle sensors implemented on any suitable vehicle according to the inventive concepts disclosed herein.

Figure 4:
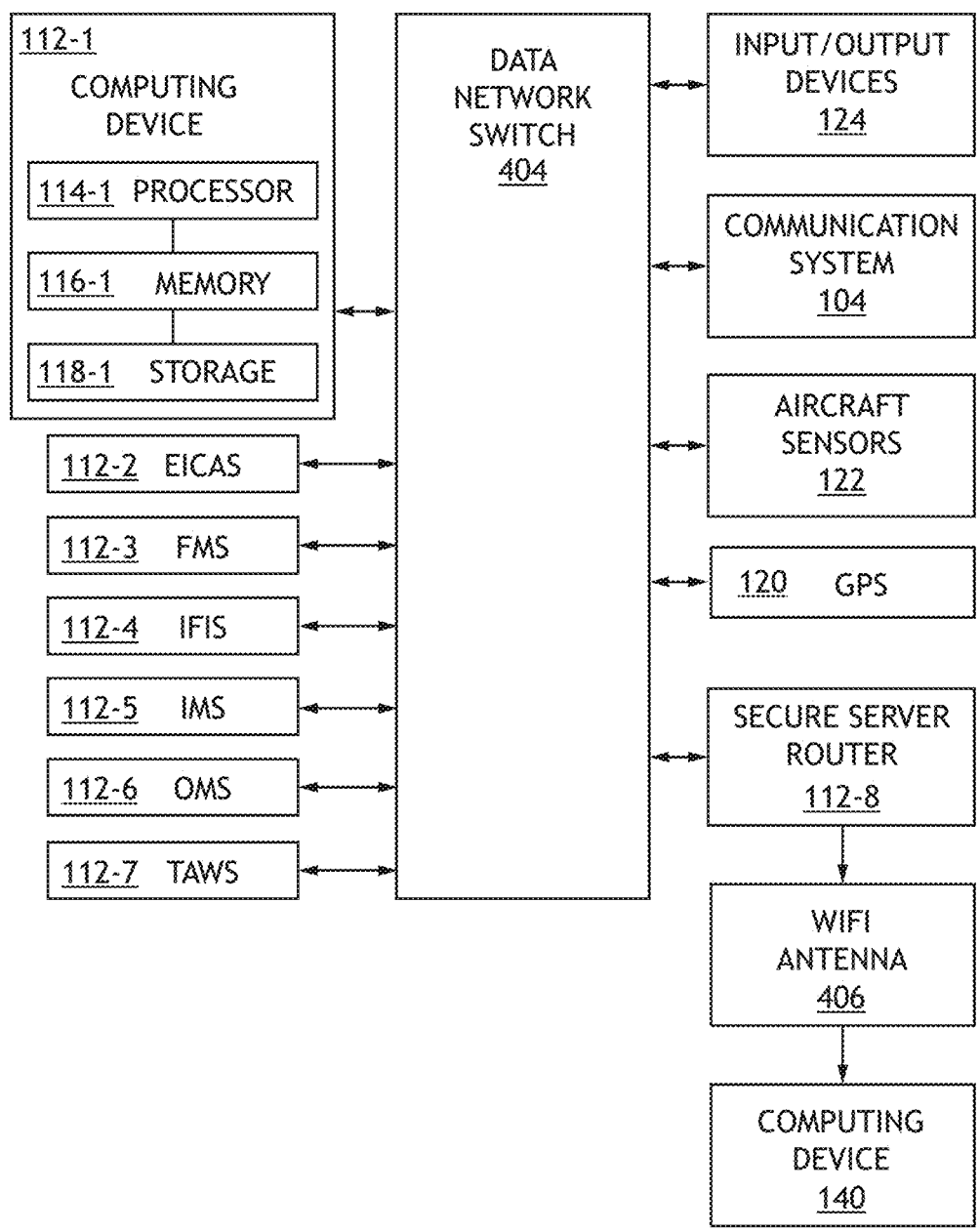
FIG. 4 is a view of exemplary devices of the aircraft of FIG. 1 communicatively coupled via a data network switch of an exemplary embodiment according to the inventive concepts disclosed herein.

Referring now to FIG. 4, various exemplary devices of the aircraft 102 of FIG. 1 communicatively coupled via a data network switch 404 (e.g., an avionics full-duplex Ethernet (AFDX) switch) are shown. For example, a plurality of computing devices 112 (e.g., avionics computing devices), the input/output devices 124, the communication system 104, vehicular sensors (e.g., the aircraft sensors 122), and the GPS device 120 may be communicatively coupled via the data network switch 404. Each of the plurality of avionics computing devices (e.g., 112-1, 112-2, 112-3, 112-4, 112-5, 112-6, 112-7, 112-8), the input/output devices 124, the communication system 104, vehicular sensors (e.g., the aircraft sensors 122), and the GPS device 120 may be configured to exchange (e.g., send and/or receive) avionics data with one another via the data network switch 404. While the plurality of computing devices 112, the input/output devices 124, the communication system 104, the aircraft sensors 122, and the GPS device 120 are exemplarily shown as being communicatively coupled via the data network switch 404, in some embodiments some or all of the plurality of computing devices 112, the input/output devices 124, the communication system 104, the vehicular sensors (e.g., the aircraft sensors 122), and the GPS device 120 may be communicatively coupled via any suitable data networks and via any suitable data networking components (e.g., at least one bus (e.g., Aeronautical Radio, Incorporated (ARINC) 429 busses), at least one data concentrator, at least one switch, at least one router, or a combination thereof).

The plurality of computing devices 112 may be implemented as and/or include a plurality of vetronics computing devices, such as a plurality of avionics computing devices (e.g., which may be implemented in one or more integrated modular avionics (IMA) cabinets). The plurality of avionics computing devices may include a first avionics computing device 112-1, a crew alerting system (CAS) computing device (e.g., an engine indication and crew alerting system (EICAS) computing device 112-2), a flight management system (FMS) computing device 112-3, an integrated flight information system (IFIS) computing device 112-4, an information management system (IMS) computing device 112-5, an onboard maintenance system (OMS) computing device 112-6, a terrain awareness and warning system (TAWS) computing device 112-7, a secure server router computing device 112-8, an automatic dependent surveillance (ADS) computing device (not shown), and a traffic collision avoidance system (TCAS) computing device (not shown), as well as other avionics computing devices commonly implemented in an aircraft. Additionally, the input/output devices 124, the communication system 104, the aircraft sensors 122, the data network switch 404, and the GPS device 120 may be considered to be devices of the plurality of avionics computing devices and may be implemented similarly as and function similarly as avionics devices (e.g., 112-1, 112-2, 112-3, 112-4, 112-5, 112-6, 112-7, 112-8) as disclosed throughout. Each of the plurality of avionics computing devices (e.g., 112-1, 112-2, 112-3, 112-4, 112-5, 112-6, 112-7, 112-8) may include components, which may be implemented and function similarly as the components of the computing device 112 shown and described with respect to FIG. 1. As such, each of the plurality of avionics computing devices may include at least one processor, memory, and storage, which may be implemented and function similarly as the processor 114, the memory 116, and the storage 118, respectively, of the computing device 112 shown and described with respect to FIG. 1. For example, the first avionics computing device 112-1 may include a processor 114-1, memory 116-1, and storage 118-1, which may be implemented and function similarly as the processor 114, the memory 116, and the storage 118, respectively, of the computing device 112 shown and described with respect to FIG. 1.

The plurality of avionics computing devices (e.g., 112-1, 112-2, 112-3, 112-4, 112-5, 112-6, 112-7, 112-8) and/or processors thereof (e.g., 114-1) may be implemented as special purpose computers (e.g., the first avionics computing device 112-1, the EICAS computing device 112-2, the FMS computing device 112-3, the IFIS computing device 112-4, the IMS computing device 112-5, the OMS computing device 112-6, the TAWS computing device 112-7, and the secure server router computing device 112-8) and/or special purpose processors (e.g., the processor 114-1 of the first avionics computing device 112-1 programmed to execute instructions for operations as disclosed throughout, a processor of the EICAS computing device 112-2 programmed to execute instructions for performing EICAS operations as disclosed throughout, a processor of the FMS computing device 112-3 programmed to execute instructions for performing FMS operations as disclosed throughout, a processor of the IFIS computing device 112-4 programmed to execute instructions for performing IFIS operations as disclosed throughout, a processor of the IMS computing device 112-5 programmed to execute instructions for performing IMS operations as disclosed throughout, a processor of the OMS computing device 112-6 programmed to execute instructions for performing OMS operations as disclosed throughout, a processor of the TAWS computing device 112-7 programmed to execute instructions for performing TAWS operations as disclosed throughout, and a processor of the secure server router computing device 112-8 programmed to execute instructions for performing secure server router operations as disclosed throughout) configured to execute instructions for performing any or all of the operations disclosed throughout.

The EICAS computing device 112-2 may be configured to provide aircraft crew with information (e.g., as annunciations (e.g., as messages and/or alerts) and instrumentation (e.g., which may be graphically displayed on any suitable display)) about engines and other systems of the aircraft 102. A processor of the EICAS computing device 112-2 may be configured to perform any of various, suitable operations, which are commonly performed by EICASs, as would be appreciated by those skilled in the art, such as sending and/or receiving messages. For example, the EICAS computing device 112-2 may be configured to send avionics data (e.g., EICAS data) to the secure server router computing device 112-8. In addition to performing commonly performed operations, some embodiments include a processor of the EICAS computing device 112-2 being configured (e.g., programmed) to perform additional operations.

The FMS computing device 112-3 may be configured to automate various in-flight tasks, such as managing a flight plan of the aircraft 102. A processor of the FMS computing device 112-3 may be configured to perform any of various, suitable operations, which are commonly performed by FMSs, as would be appreciated by those skilled in the art, such as sending and/or receiving messages. For example, the FMS computing device 112-3 may be configured to send avionics data (e.g., FMS data) to the secure server router computing device 112-8. In addition to performing commonly performed operations, some embodiments include the processor of the FMS computing device 112-3 being configured (e.g., programmed) to perform additional operations.

A processor of the IFIS computing device 112-4 may be configured to perform any of various, suitable operations, which are commonly performed by IFISs, as would be appreciated by those skilled in the art, such as sending and/or receiving messages. For example, the IFIS computing device 112-4 may be configured to send avionics data (e.g., IFIS data) to the secure server router computing device 112-8. In addition to performing commonly performed operations, some embodiments include the processor of the IFIS computing device 112-4 being configured (e.g., programmed) to perform additional operations.

A processor of the IMS computing device 112-5 may be configured to perform any of various, suitable operations, which are commonly performed by IMSs, as would be appreciated by those skilled in the art, such as sending and/or receiving messages. For example, the IMS computing device 112-5 may be configured to send avionics data (e.g., IMS data) to the secure server router computing device 112-8. In addition to performing commonly performed operations, some embodiments include the processor of the IMS computing device 112-5 being configured (e.g., programmed) to perform additional operations.

A processor of the OMS computing device 112-6 may be configured to perform any of various, suitable operations, which are commonly performed by OMSs, as would be appreciated by those skilled in the art, such as collecting and monitoring health data and sending and/or receiving messages. For example, the OMS computing device 112-6 may be configured to send avionics data (e.g., OMS data) to the secure server router computing device 112-8. In addition to performing commonly performed operations, some embodiments include the processor of the OMS computing device 112-6 being configured (e.g., programmed) to perform additional operations.

A processor of the TAWS computing device 112-7 may be configured to perform any of various, suitable operations, which are commonly performed by TAWSs, as would be appreciated by those skilled in the art, such as sending and/or receiving messages. For example, the TAWS computing device 112-7 may be configured to send avionics data (e.g., TAWS data) to the secure server router computing device 112-8. In addition to performing commonly performed operations, some embodiments include the processor of the TAWS computing device 112-7 being configured (e.g., programmed) to perform additional operations.

The secure server router computing device 112-8 may be configured to access, receive, and/or collect avionics data from any of the avionics computing devices (e.g., 112-1, 112-2, 112-3, 112-4, 112-5, 112-6, 112-7, 112-8), the input/output devices 124, the communication system 104, vehicular sensors (e.g., the aircraft sensors 122), and the GPS device 120. For example, the processor of the secure server router computing device 112-8 may be configured to receive messages from other devices (e.g., another computing device 112 (e.g., another avionics computing device), the input/output devices 124, the communication system 104, the aircraft sensors 122, the GPS device 120, the data network switch 404, an off-board device, or a combination thereof). For example, such messages may be transmitted by another device, routed over network components (e.g., busses) through the data network switch 404, and received by the secure server router computing device 112-8.

In some embodiments, the secure server router computing device 112-8 may be configured to establish secure wireless connections to electronic flight bag (EFB) devices in a cockpit of the aircraft 102. Additionally, for example, the secure server router computing device 112-8 may be configured to exchange data with a ground communication system by using dual cellular, Wi-Fi, and/or satellite communication (SATCOM) networks. The secure server router computing device 112-8 may be configured to utilize ARINC-834-4 service to provide secure server router status and to rebroadcast avionics data (e.g., avionic parameters). Further, the secure server router computing device 112-8 may be configured to interface with avionics computing devices (e.g., 112-1, 112-2, 112-3, 112-4, 112-5, 112-6, 112-7) to access live avionics data (e.g., avionics parameters). In an exemplary embodiment, the secure server router computing device 112-8 may be implemented as a flight operation and maintenance exchange (FOMAX) computing device.

Additionally, the secure server router computing device 112-8 may be configured to filter (e.g., select relevant portions of) available avionics data based at least on a predetermined relevance to the situation awareness program stored in and executed by the non-avionics computing device 140. The secure server router computing device 112-8 may be programmed with data indicative of which avionics data is relevant to the situation awareness program. Further, the secure server router computing device 112-8 may be configured to output the filtered avionics data to the non-avionics computing device 140. For example, the secure server router computing device 112-8 may be configured to output the filtered avionics data to an antenna (e.g., a WIFI antenna 406) for transmission via a secure wireless connection to the non-avionics computing device 140. A processor of the secure server router computing device 112-8 may be configured to perform any of various, suitable operations, which are commonly performed by secure server routers, as would be appreciated by those skilled in the art, such as sending and/or receiving messages. In addition to performing commonly performed operations, some embodiments include the processor of the secure server router computing device 112-8 being configured (e.g., programmed) to perform additional operations.

While exemplary functionality of the secure server router computing device 112-8 has been described with respect to an exemplary embodiment, in some embodiments processor(s) of any or all of the plurality of avionics computing devices (e.g., 112-2, 112-3, 112-4, 112-5, 112-6, 112-7, 112-8) may be configured (e.g., programmed) similarly as the processor of the secure server router computing device 112-8 to perform similar operations.

In addition to performing commonly performed operations, some embodiments include one or more of the plurality of computing devices (e.g., the plurality of avionics computing devices (e.g., 112-2, 112-3, 112-4, 112-5, 112-6, 112-7, 112-8) being configured (e.g., programmed) to perform additional operations.

While the first avionics computing device 112-1, the EICAS computing device 112-2, the FMS computing device 112-3, the IFIS computing device 112-4, the IMS computing device 112-5, the OMS computing device 112-6, the TAWS computing device 112-7, and the secure server router computing device 112-8 of the aircraft 102 have been exemplarily depicted as being implemented as separate avionics computing devices, in some embodiments, some or all of the first avionics computing device 112-1, the EICAS computing device 112-2, the FMS computing device 112-3, the IFIS computing device 112-4, the IMS computing device 112-5, the OMS computing device 112-6, the TAWS computing device 112-7, and the secure server router computing device 112-8 may be implemented as a single integrated computing device or as any number of integrated and/or partially integrated computing devices.

Additionally, in some embodiments, the data network switch 404 may be implemented similarly as and function similarly to one of the avionics computing devices (e.g., 112-1, 112-2, 112-3, 112-4, 112-5, 112-6, 112-7, or 112-8) or include components that function similarly to components of one of the avionics computing devices. For example, the data network switch 404 may include an integrated computing device (which may be implemented and function similarly to one of the computing devices 112 (e.g., one of the avionics computing devices (e.g., 112-1, 112-2, 112-3, 112-4, 112-5, 112-6, 112-7, 112-8))) and/or integrated computing device components (which may be implemented and function similarly to components of one of the computing devices 112 of FIG. 1).

Further, while the plurality of avionics computing devices has been exemplarily depicted and described with respect to FIG. 4 as including the first avionics computing device 112-1, the EICAS computing device 112-2, the FMS computing device 112-3, the IFIS computing device 112-4, the IMS computing device 112-5, the OMS computing device 112-6, the TAWS computing device 112-7, and the secure server router computing device 112-8, in some embodiments, the plurality of avionics computing devices may omit one or more of the described and depicted avionics computing devices, include additional numbers of such avionics computing devices, and/or include other types of suitable avionics computing devices.

The non-avionics computing device 140 may be configured to receive the filtered avionics data via a wireless connection (e.g., a secure wireless connection) from one of the avionics computing devices (e.g., the secure server router computing device 112-8). Additionally, the processor 144 of the non-avionics computing device 140 may be configured to execute a situation awareness program stored in the at least one non-avionics non-transitory computer-readable medium (e.g., memory 146 and/or storage 148). Additionally, the processor 144 of the non-avionics computing device 140 may be configured to organize at least a portion of the filtered avionics data into situation awareness data structures. Each of the situation awareness data structures may be configured to contain a portion of the filtered avionics data associated with a situation of a plurality of predetermined situations. For example, the plurality of predetermined situations may include a flight configuration profile during a particular stage of flight, system synoptics, a takeoff, a landing, and/or trajectory conformance. Additionally, the processor 144 may be configured to receive a user input (e.g., a user selection) to display content associated with a particular situation awareness data structure. Further, the processor 144 may be configured to generate a graphical user interface based at least on the particular situation awareness data structure. The graphical user interface may include graphical representation content associated with the particular situation awareness data structure and textual content associated with the particular situation awareness data structure, and the graphical representation content and the textual content may be relevant to the particular situation. Additionally, the processor 144 may be configured to output the graphical user interface to the display 142 of the non-avionics computing device 140 for presentation to a user, such as a flight crew member (e.g., a pilot).

Figure 5:
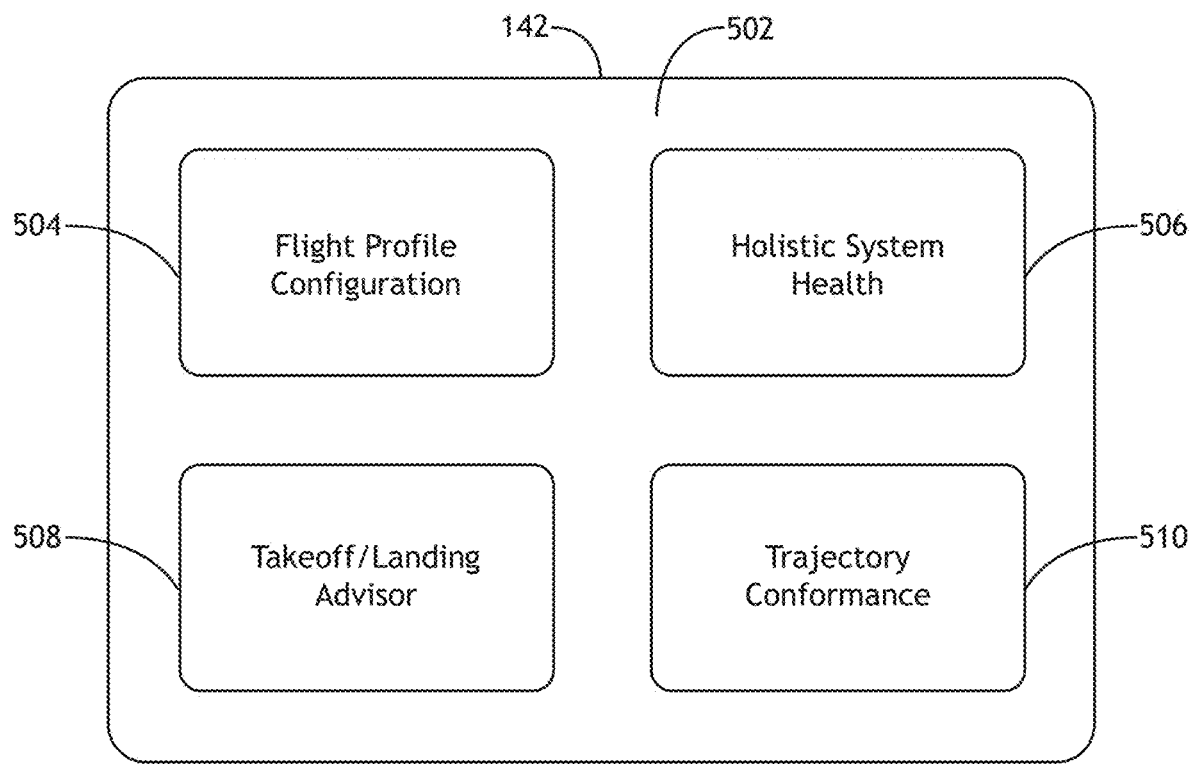
FIG. 5 is an exemplary view of the display of the non-avionics computing device of FIG. 1 of an exemplary embodiment according to the inventive concepts disclosed herein.

Referring now to FIG. 5, an exemplary view of the display 142 of the non-avionics computing device 140 according to the inventive concepts disclosed herein is shown. The processor 144 of the non-avionics computing device 140 may be configured to generate a graphical user interface (GUI) 502 and output the GUI 502 as data for presentation by the display 142. The GUI 502 may include a plurality of user-selectable GUI elements (e.g., 504, 506, 508, 510), each of which may be associated with a situation of a plurality of predetermined situations and/or with a particular situation awareness data structure.

For example, a plurality of user-selectable GUI elements (e.g., 504, 506, 508, 510) may include a user-selectable flight configuration GUI element 504 (e.g., "flight profile configuration"), a user-selectable system synoptics GUI element 506 (e.g., "holistic health system"), a user-selectable takeoff and/or landing GUI element 508 (e.g., "takeoff/landing advisor"), and a user-selectable trajectory conformance GUI element 510 (e.g., "trajectory conformance"). A user's selection of a particular user-selectable flight configuration GUI element (e.g., 504, 506, 508, 510) may cause the processor 144 to generate and output a GUI based at least on the particular situation awareness data structure associated with the selected particular user-selectable flight configuration GUI element. The GUI may include graphical representation content associated with the particular situation awareness data structure and/or textual content associated with the particular situation awareness data structure. The graphical representation content and/or the textual content may be relevant to the particular situation. The processor 144 may be configured to output the GUI to the display 142 of the non-avionics computing device 140 for presentation to a user.

A user's selection of the user-selectable flight configuration GUI element 504 may cause the processor 144 to generate and output a flight configuration GUI (e.g., 802 of FIG. 8), which may include graphical representation content associated with the flight configuration situation awareness data structure and textual content associated with the flight configuration situation awareness data structure. The flight configuration situation awareness data structure may be configured to contain a portion of the filtered avionics data (e.g., FMS data and/or other aircraft system data) associated with a flight configuration profile during a particular stage of flight. The graphical representation content and/or the textual content may be relevant to the particular situation of a flight configuration profile during a particular stage (e.g., takeoff, landing, approach, and/or cruise) of flight. At all stages in the flight profile, but particularly for takeoff and landing, the aircraft 102 needs to be configured appropriately. The processor 144 may be configured to receive and process (e.g., aggregate) portions of the filtered avionics data from various aircraft systems (e.g., avionics computing devices 112) and the FMS computing device 112-3, to generate the flight configuration GUI for presentation to the flight crew with integrated graphical representation content and/or the textual content associated with flight configuration information. Additionally, the flight configuration GUI may be configured to advise the flight crew if any of the configuration items (e.g., landing gear, spoilers) were close to an operational limitation (e.g., speed for deployment). For example, content (e.g., graphical representation content and/or the textual content) of the flight configuration GUI may be associated with information of landing gear, flaps, slats, spoilers, trims, center of gravity, aircraft weight, anti-ice system status, and/or thrust (e.g., thrust mode, target value, and/or actual value).

A user's selection of the user-selectable system synoptics GUI element 506 may cause the processor 144 to generate and output a system synoptics GUI (e.g., 602A of FIG. 6A, 602B of FIG. 6B, 702 of FIG. 7), which may include graphical representation content associated with the system synoptics situation awareness data structure and textual content associated with the system synoptics situation awareness data structure. The system synoptics situation awareness data structure may be configured to contain a portion of the filtered avionics data associated with aircraft systems and operational states of the aircraft systems. The processor 144 may be configured to receive and process (e.g., aggregate) portions of the filtered avionics data from various aircraft systems and to generate the system synoptics GUI for presentation to the flight crew with integrated graphical representation content and/or the textual content associated with system synoptics information. The system synoptics GUI may be configured to provide an integrated graphical representation of the aircraft and the operational state of one or more aircraft systems, such as an electrical system, a hydraulic system, a bleed air system, an environmental conditioning system, a fuel system, and/or a fire warning/suppression system. Additionally, system synoptics GUI may include user-selectable GUI elements that allow the user to select one or more specific systems, and in response to such user selection, the processor may be configured to generate a system specific synoptics GUI (e.g., 602B). For example, the system specific synoptics GUI may be configured to provide indications of key parameter trends, which may help pilots spot any impending faults prior to triggering a crew alerting system (CAS) message. In the case of a system fault, additional information from flight and equipment manuals could be accessed directly from the page by selecting a flight and equipment manual GUI element (e.g., 618).

A user's selection of the user-selectable takeoff and/or landing GUI element 508 may cause the processor 144 to generate and output a takeoff and/or landing GUI, which may include graphical representation content associated with the takeoff and/or landing situation awareness data structure and textual content associated with the takeoff and/or landing situation awareness data structure. The takeoff and/or landing situation awareness data structure may be configured to contain a portion of the filtered avionics data associated with departure and/or arrival airport parameters, aircraft capabilities, and a departure and/or approach procedure. The processor 144 may be configured to receive and process (e.g., aggregate) portions of the filtered avionics data from various aircraft systems and to generate the takeoff and/or landing GUI for presentation to the flight crew with integrated graphical representation content and/or the textual content associated with takeoff and/or landing information. In preparation for takeoff and landing, the processor 144 may be configured to access all available information concerning the departure or arrival airport, and compare the airport parameters against aircraft capabilities and/or limitations and the selected approach or departure procedure. Such parameters may include altimeter setting, ceiling, visibility, temperature, temperature compensation (e.g., requirement and selected state), precipitation type, surface wind and gusts, significant meteorological information (SIGMET), runway information and condition, runway lighting, procedures (e.g., noise abatement), obstacles (e.g., departure limitations), and/or pilot reports. Likewise, the processor 144 may be configured to generate and output the takeoff and/or landing GUI based at least on such accessed information.

A user's selection of the user-selectable trajectory conformance GUI element 510 may cause the processor 144 to generate and output a trajectory conformance GUI, which may include graphical representation content associated with the trajectory conformance situation awareness data structure and textual content associated with the trajectory conformance situation awareness data structure. The trajectory conformance situation awareness data structure may be configured to contain a portion of the filtered avionics data associated with conformance of an aircraft trajectory to a flight plan. The processor 144 may be configured to receive and process (e.g., aggregate) portions of the filtered avionics data from various aircraft systems and to generate the trajectory conformance GUI for presentation to the flight crew with integrated graphical representation content and/or the textual content associated with trajectory conformance information. The trajectory conformance GUI may allow a pilot to monitor conformance of the aircraft trajectory to a flight plan (e.g., past, current and projected). The trajectory conformance GUI may also provide for monitoring of available margins between aircraft state and operational limitations (e.g. speed, altitude). For example, conformance parameters may include airspeed, altitude, track and/or heading, fuel burn and quantity, and/or schedule (e.g., estimated time of arrival (ETA) and/or required time of arrival (RTA)). The trajectory conformance GUI may include one or both of spatial- and time-based graphical representations. For example, such time-based graphical representations may provide indications as to when in time the aircraft will reach a waypoint or execute a lateral, vertical, or speed maneuver.

Figure 6A:
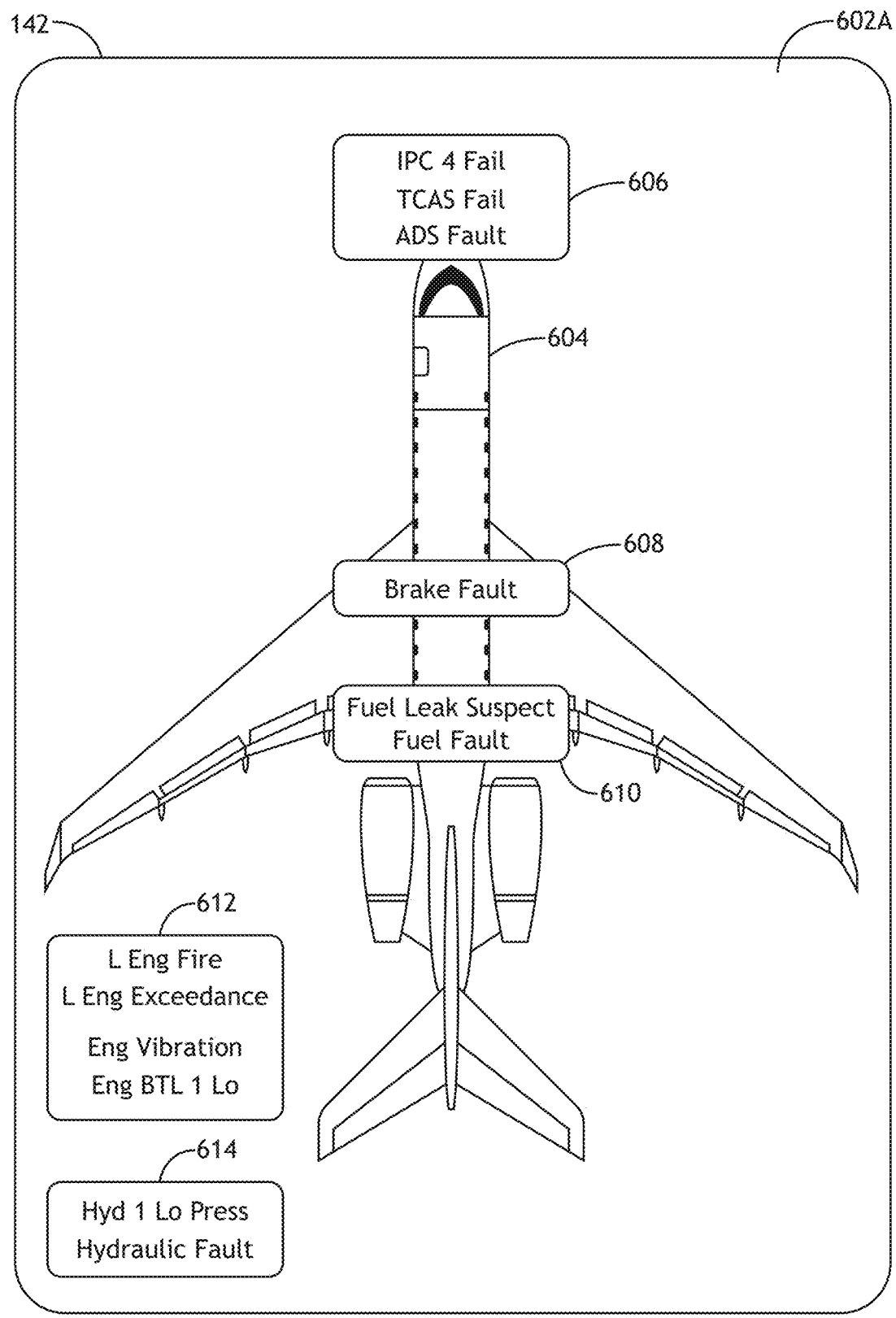
FIG. 6A is an exemplary view of the display of the non-avionics computing device of FIG. 1 of an exemplary embodiment according to the inventive concepts disclosed herein.

Referring now to FIG. 6A, an exemplary view of the display 142 of the non-avionics computing device 140 according to the inventive concepts disclosed herein is shown. The display 142 may be configured to display a system synoptics GUI 602A, which may include graphical representation content associated with the system synoptics situation awareness data structure and textual content associated with the system synoptics situation awareness data structure. For example, the system synoptics GUI 602A may include a graphical representation 604 of the aircraft 102 and a plurality of CAS messages at least some of which may be positioned relative to an affected location of the aircraft. For example, at least some of the CAS messages may grouped (e.g., in CAS message boxes 606, 608, 610, 612, 614) based at least on an affected aircraft location and/or a relation to a specific aircraft system. For example, engine CAS messages may be grouped in the CAS message box 612 and hydraulic system CAS messages may be grouped in the CAS message box 614.

For example, CAS messages (e.g., "IPC 4 Fail", "TCAS Fail", "ADS Fault") relating to the cockpit may be grouped in CAS message box 606 displayed near the cockpit of the graphical representation 604 of the aircraft 102. For example, CAS messages (e.g., "Brake Fault") relating to the landing gear may be grouped in CAS message box 608 displayed near the landing gear of the graphical representation 604 of the aircraft 102. For example, CAS messages (e.g., "Fuel Leak Suspect", "Fuel Fault") relating to the fuel system may be grouped in CAS message box 610 displayed near the fuel system of the graphical representation 604 of the aircraft 102. For example, CAS messages (e.g., Left Engine Fire, Left Engine Exceedance, Engine Vibration, Engine BTL 1 Low) relating to the engines may be grouped in CAS message box 612 displayed near the engines of the graphical representation 604 of the aircraft 102. For example, CAS messages (e.g., Hydraulic system 1 low pressure, Hydraulic Fault) relating to the hydraulic system may be grouped in CAS message box 614 displayed near a portion of the hydraulic system of the graphical representation 604 of the aircraft 102. In some embodiments, one or more CAS messages and/or a CAS message box (e.g., 606, 608, 610, 612, and/or 614) may be selected by a user. Based on such a user selection, the processor 144 may be configured to generate a system specific synoptics GUI (e.g., 602B).

In some embodiments, the CAS messages may be colored based at least on a severity of the message; for example, cyan or green CAS messages may have a lowest severity, yellow CAS messages may be moderately severe, and red CAS messages may have a highest severity.

Figure 6B:
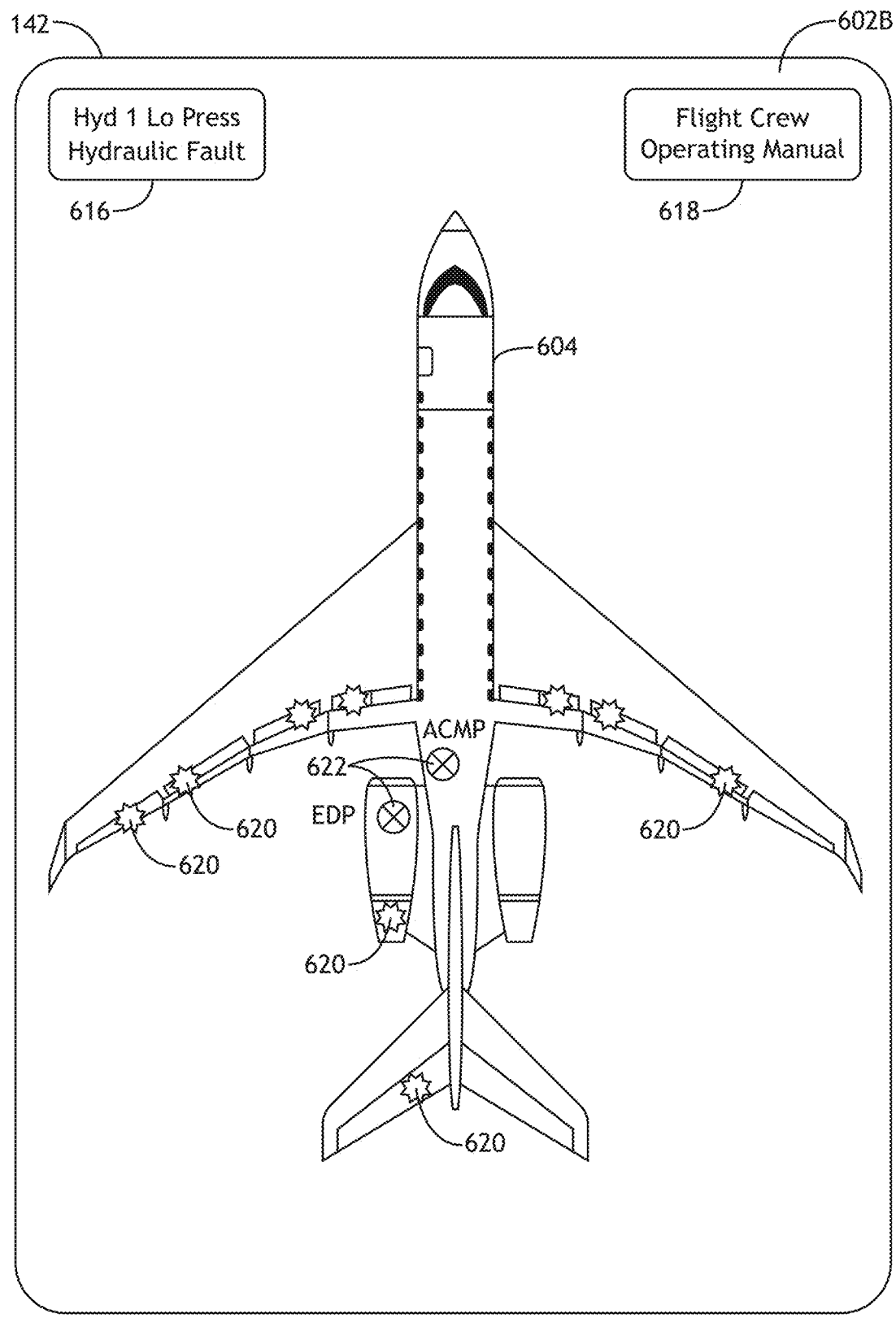
FIG. 6B is an exemplary view of the display of the non-avionics computing device of FIG. 1 of an exemplary embodiment according to the inventive concepts disclosed herein.

Referring now to FIG. 6B, an exemplary view of the display 142 of the non-avionics computing device 140 according to the inventive concepts disclosed herein is shown. The display 142 may be configured to display a system specific synoptics GUI 602B, which may include graphical representation content associated with a specific system of the system synoptics situation awareness data structure and textual content associated with the specific system of the system synoptics situation awareness data structure. For example, the system specific synoptics GUI 602B is a hydraulic system synoptics GUI. The system specific synoptics GUI 602B may include a graphical representation 604 of the aircraft 102, one or more CAS messages, and/or fault icons positioned near an affected location of the aircraft 102. For example, at least some of the CAS messages may be grouped in CAS message box 616. For example, alert icons 620, 622 may be positioned near affected portions of the graphical representation 604 of the aircraft 102. Each of the distinct alert icons 620, 622 may be associated with a particular CAS message.

Figure 7:
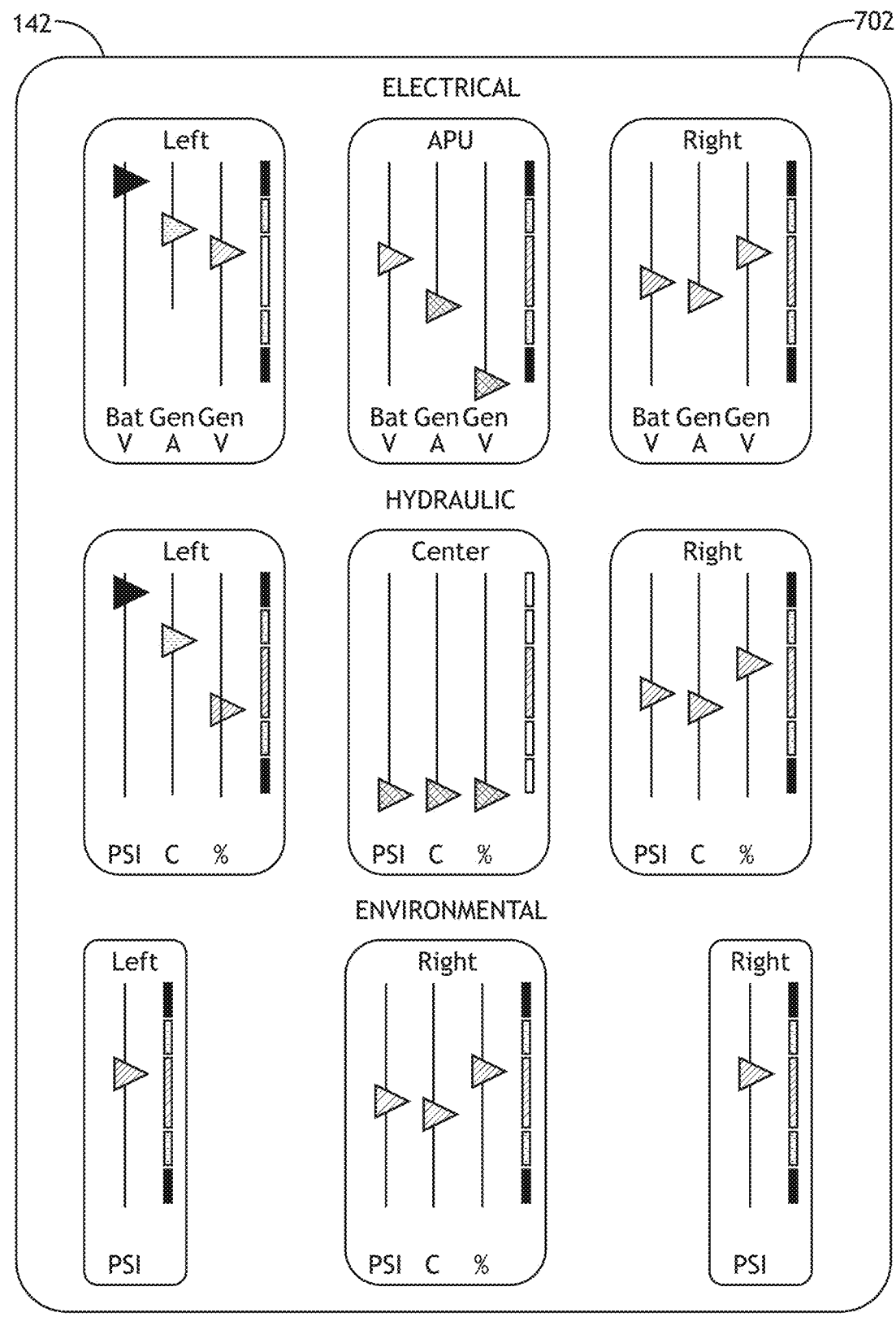
FIG. 7 is an exemplary view of the display of the non-avionics computing device of FIG. 1 of an exemplary embodiment according to the inventive concepts disclosed herein.

Referring now to FIG. 7, an exemplary view of the display 142 of the non-avionics computing device 140 according to the inventive concepts disclosed herein is shown. The display 142 may be configured to display a system synoptics GUI 702, which may include graphical representation content associated with the system synoptics situation awareness data structure and textual content associated with the system synoptics situation awareness data structure. For example, the system synoptics GUI 702 may include graphical representation content and textual content associated with various aircraft systems, such as an electrical system, a hydraulic system, and an environmental conditioning system. Information about the various aircraft systems may be grouped by system. The graphical representation content and textual content for each system may indicate an operational state of a particular system with respect to one or more parameters.

Figure 8:
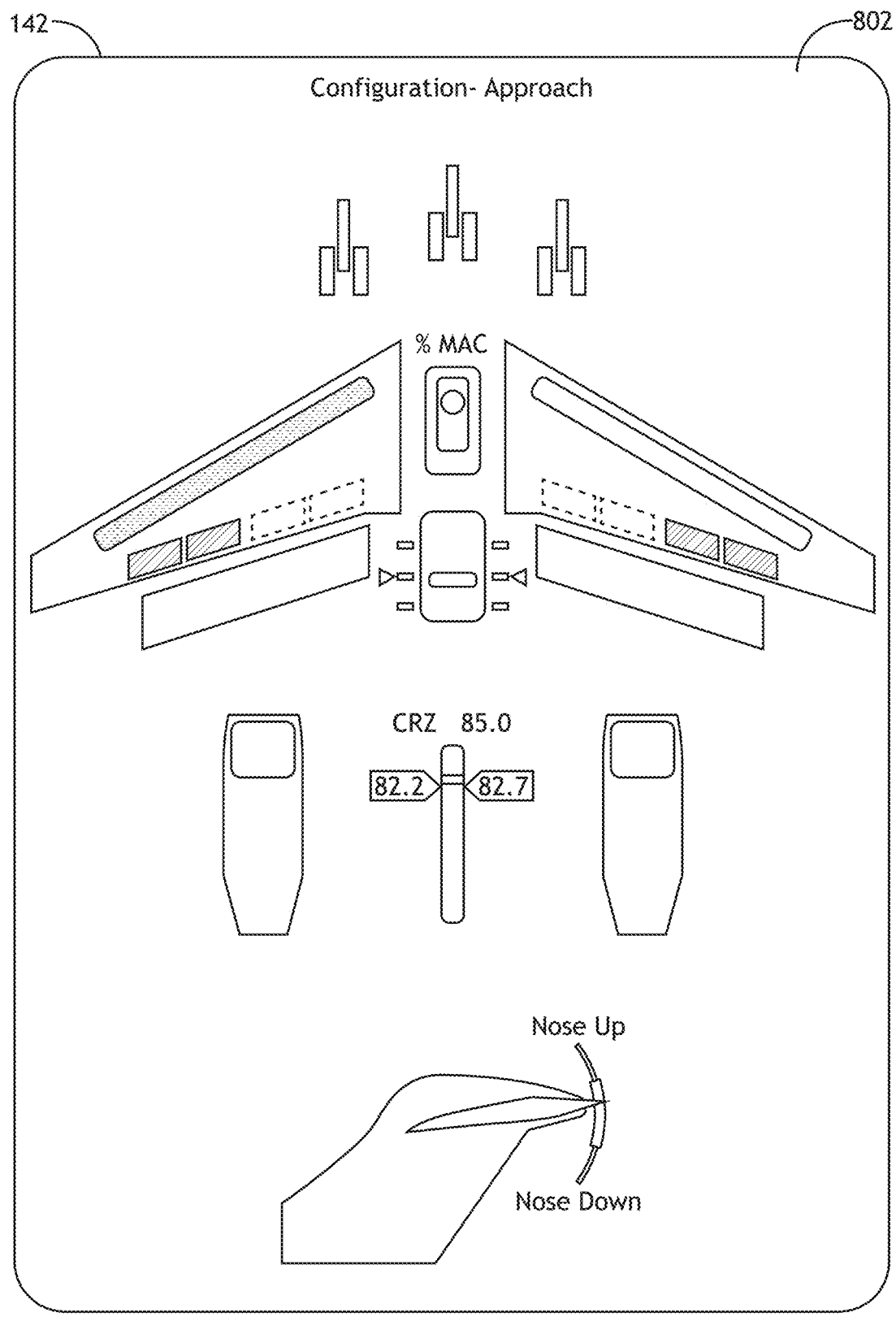
FIG. 8 is an exemplary view of the display of the non-avionics computing device of FIG. 1 of an exemplary embodiment according to the inventive concepts disclosed herein.

Referring now to FIG. 8, an exemplary view of the display 142 of the non-avionics computing device 140 according to the inventive concepts disclosed herein is shown. The display 142 may be configured to display a flight configuration GUI 802, which may include graphical representation content associated with the flight configuration situation awareness data structure and textual content associated with the flight configuration situation awareness data structure. For example, the flight configuration GUI 802 may include graphical representation content and textual content associated with various aircraft equipment, such as landing gear, flaps, slats, spoilers, trims, cargo and weight, anti-ice system status, and thrust.

Figure 9:
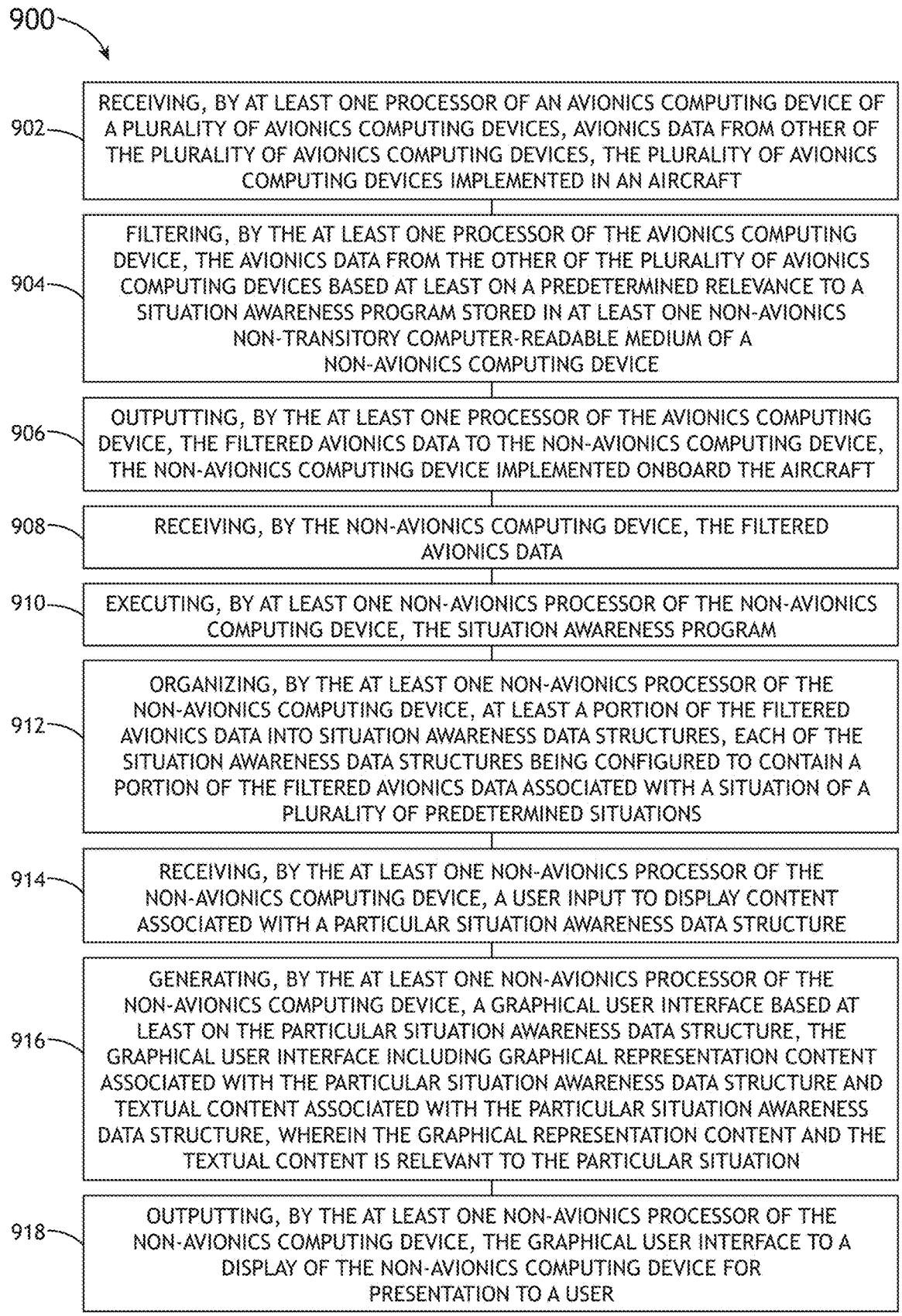
FIG. 9 is a diagram of an exemplary embodiment of a method according to the inventive concepts disclosed herein.

Referring now to FIG. 9, an exemplary embodiment of a method 900 according to the inventive concepts disclosed herein may include one or more of the following steps. Some embodiments may include performing one or more steps of the method 900 iteratively, concurrently, sequentially, and/or non-sequentially. Additionally, for example, some embodiments may include performing one or more instances of the method 900 iteratively, concurrently, and/or sequentially.

A step 902 may include receiving, by at least one processor of an avionics computing device of a plurality of avionics computing devices, avionics data from other of the plurality of avionics computing devices, the plurality of avionics computing devices implemented in an aircraft.

A step 904 may include filtering, by the at least one processor of the avionics computing device, the avionics data from the other of the plurality of avionics computing devices based at least on a predetermined relevance to a situation awareness program stored in at least one non-avionics non-transitory computer-readable medium of a non-avionics computing device.

A step 906 may include outputting, by the at least one processor of the avionics computing device, the filtered avionics data to the non-avionics computing device, the non-avionics computing device implemented onboard the aircraft.

A step 908 may include receiving, by the non-avionics computing device, the filtered avionics data.

A step 910 may include executing, by at least one non-avionics processor of the non-avionics computing device, the situation awareness program.

A step 912 may include organizing, by the at least one non-avionics processor of the non-avionics computing device, at least a portion of the filtered avionics data into situation awareness data structures, each of the situation awareness data structures being configured to contain a portion of the filtered avionics data associated with a situation of a plurality of predetermined situations.

A step 914 may include receiving, by the at least one non-avionics processor of the non-avionics computing device, a user input to display content associated with a particular situation awareness data structure.

A step 916 may include generating, by the at least one non-avionics processor of the non-avionics computing device, a graphical user interface based at least on the particular situation awareness data structure, the graphical user interface including graphical representation content associated with the particular situation awareness data structure and textual content associated with the particular situation awareness data structure, wherein the graphical representation content and the textual content is relevant to the particular situation.

A step 918 may include outputting, by the at least one non-avionics processor of the non-avionics computing device, the graphical user interface to a display of the non-avionics computing device for presentation to a user.

Further, the method 900 may include any of the operations disclosed throughout.

As will be appreciated from the above, embodiments of the inventive concepts disclosed herein may be directed to a method, a system, and devices configured to providing an operator of a vehicle with relevant information, organized in such a way as to improve (e.g., maximize) situation awareness.

As used throughout and as would be appreciated by those skilled in the art, "at least one non-transitory computer-readable medium" may refer to as at least one non-transitory computer-readable medium (e.g., memory 110, memory 116, memory 146, memory 212, memory 116-1, storage 118, storage 148, storage 214, storage 118-1, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a non-avionics computing device comprising a display, at least one non-avionics non-transitory computer-readable medium, and at least one non-avionics processor communicatively coupled to the at least one non-avionics non-transitory computer-readable medium, the non-avionics computing device implemented onboard an aircraft, wherein the at least one non-avionics processor is configured to execute a situation awareness program stored in the at least one non-avionics non-transitory computer-readable medium;
   at least one data network switch implemented in the aircraft; and
   a plurality of avionics computing devices implemented in the aircraft, each of the plurality of avionics computing devices communicatively coupled to the at least one data network switch, each of the plurality of avionics computing devices comprising at least one non-transitory computer-readable medium and at least one processor communicatively coupled to the at least one non-transitory computer-readable medium, wherein the plurality of avionics computing devices includes a first avionics computing device communicatively coupled to the non-avionics computing device, wherein the first avionics computing device is configured to:
      receive avionics data from other of the plurality of avionics computing devices;
      filter the avionics data from the other of the plurality of avionics computing devices based at least on a predetermined relevance to the situation awareness program; and
      output the filtered avionics data to the non-avionics computing device.

2. The system of claim 1, wherein the non-avionics computing device is configured to receive the filtered avionics data, wherein, by execution of the situation awareness program, the at least one non-avionics processor is configured to:
   organize at least a portion of the filtered avionics data into situation awareness data structures, each of the situation awareness data structures being configured to contain a portion of the filtered avionics data associated with a situation of a plurality of predetermined situations;
   receive a user input to display content associated with a particular situation awareness data structure;
   generate a graphical user interface based at least on the particular situation awareness data structure, the graphical user interface including graphical representation content associated with the particular situation awareness data structure and textual content associated with the particular situation awareness data structure, wherein the graphical representation content and the textual content is relevant to the particular situation; and
   output the graphical user interface to the display of the non-avionics computing device for presentation to a user.

3. The system of claim 2, wherein the particular situation awareness data structure is a flight configuration situation awareness data structure, wherein the flight configuration situation awareness data structure is configured to contain a portion of the filtered avionics data associated with a flight configuration profile during a particular stage of flight, wherein the portion of the filtered avionics data includes flight management system data.

4. The system of claim 2, wherein the particular situation awareness data structure is a system synoptics situation awareness data structure, wherein the system synoptics situation awareness data structure is configured to contain a portion of the filtered avionics data associated with aircraft systems and operational states of the aircraft systems.

5. The system of claim 4, wherein the aircraft systems include an electrical system and a hydraulic system.

6. The system of claim 2, wherein the particular situation awareness data structure is a takeoff situation awareness data structure, wherein the takeoff situation awareness data structure is configured to contain a portion of the filtered avionics data associated with departure airport parameters, aircraft capabilities, and a departure procedure.

7. The system of claim 2, wherein the particular situation awareness data structure is a landing situation awareness data structure, wherein the landing situation awareness data structure is configured to contain a portion of the filtered avionics data associated with arrival airport parameters, aircraft capabilities, and an approach procedure.

8. The system of claim 2, wherein the particular situation awareness data structure is a trajectory conformance situation awareness data structure, wherein the trajectory conformance situation awareness data structure is configured to contain a portion of the filtered avionics data associated with conformance of an aircraft trajectory to a flight plan.

9. The system of claim 1, wherein the non-avionics computing device is not certified to bidirectionally exchange data with the plurality of avionics computing devices.

10. The system of claim 1, wherein the non-avionics computing device is unidirectionally communicatively coupled to the first avionics computing device such that the non-avionics computing device is configured to receive the filtered avionics data while being unable to transmit data to any of the plurality of avionics computing devices.

11. The system of claim 10, wherein the non-avionics computing device is wirelessly unidirectionally communicatively coupled to the first avionics computing device.

12. The system of claim 1, further comprising aircraft sensors, wherein the avionics data includes aircraft sensor data.

13. The system of claim 1, wherein the non-avionics computing device is a mobile computing device.

14. The system of claim 1, wherein the non-avionics computing device is a tablet computing device.

15. The system of claim 1, wherein the first avionics computing device is a secure server router avionics computing device.

16. The system of claim 1, wherein execution of the situation awareness program is configured to enhance the situational awareness of a crew member user onboard the aircraft by displaying a graphical representation content and textual content relevant to a particular situation.

17. A method, comprising:
   receiving, by at least one processor of an avionics computing device of a plurality of avionics computing devices, avionics data from other of the plurality of avionics computing devices, the plurality of avionics computing devices implemented in an aircraft;
   filtering, by the at least one processor of the avionics computing device, the avionics data from the other of the plurality of avionics computing devices based at least on a predetermined relevance to a situation awareness program stored in at least one non-avionics non-transitory computer-readable medium of a non-avionics computing device; and outputting, by the at least one processor of the avionics computing device, the filtered avionics data to the non-avionics computing device, the non-avionics computing device implemented onboard the aircraft.

18. The method of claim 17, further comprising:

receiving, by the non-avionics computing device, the filtered avionics data;

executing, by at least one non-avionics processor of the non-avionics computing device, the situation awareness program;

organizing, by the at least one non-avionics processor of the non-avionics computing device, at least a portion of the filtered avionics data into situation awareness data structures, each of the situation awareness data structures being configured to contain a portion of the filtered avionics data associated with a situation of a plurality of predetermined situations;

receiving, by the at least one non-avionics processor of the non-avionics computing device, a user input to display content associated with a particular situation awareness data structure;

generating, by the at least one non-avionics processor of the non-avionics computing device, a graphical user interface based at least on the particular situation awareness data structure, the graphical user interface including graphical representation content associated with the particular situation awareness data structure and textual content associated with the particular situation awareness data structure, wherein the graphical representation content and the textual content is relevant to the particular situation; and outputting, by the at least one non-avionics processor of the non-avionics computing device, the graphical user interface to a display of the non-avionics computing device for presentation to a user.

* * * * *